US006862597B2

(12) United States Patent
Ogaki et al.

(10) Patent No.: US 6,862,597 B2
(45) Date of Patent: Mar. 1, 2005

(54) PRINTING SYSTEM

(75) Inventors: Takeshi Ogaki, Tama (JP); Kazuhiro Ogura, Kawasaki (JP); Akinori Iwase, Yokosuka (JP); Tatsuya Haraguchi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 487 days.

(21) Appl. No.: 09/948,667

(22) Filed: Sep. 10, 2001

(65) Prior Publication Data
US 2003/0058746 A1 Mar. 27, 2003

(51) Int. Cl.[7] .............................................. G06F 17/30
(52) U.S. Cl. .................. 707/10; 707/103 R; 707/104.1; 709/203; 709/230; 358/1.15; 358/1.14; 713/189
(58) Field of Search ................................ 707/10, 104.1, 707/103 R; 709/203, 230; 713/189; 710/104; 358/1.15, 1.14

(56) References Cited

U.S. PATENT DOCUMENTS

| 6,151,286 | A | | 11/2000 | Inoue ........................... 369/84 |
| 6,362,894 | B1 | * | 3/2002 | Shima ........................ 358/1.15 |
| 2002/0138557 | A1 | * | 9/2002 | Mukaiyama et al. ....... 709/203 |
| 2002/0171859 | A1 | * | 11/2002 | Chen et al. ................. 358/1.14 |
| 2002/0181016 | A1 | * | 12/2002 | Al-Kazily et al. .......... 358/1.15 |
| 2002/0184378 | A1 | * | 12/2002 | Pineau et al. ............... 709/230 |
| 2002/0186408 | A1 | * | 12/2002 | Nakaoka et al. ........... 358/1.15 |
| 2003/0002066 | A1 | * | 1/2003 | Miyano ..................... 358/1.14 |
| 2003/0011805 | A1 | * | 1/2003 | Yacoub ...................... 358/1.15 |
| 2003/0014651 | A1 | * | 1/2003 | Strobel et al. .............. 713/189 |
| 2003/0035144 | A1 | * | 2/2003 | Shima ........................ 358/1.18 |
| 2003/0038965 | A1 | * | 2/2003 | Simpson et al. ........... 358/1.15 |
| 2003/0043395 | A1 | * | 3/2003 | Takahashi .................. 358/1.13 |
| 2003/0126328 | A1 | * | 7/2003 | Reilly ........................ 710/104 |
| 2003/0160993 | A1 | * | 8/2003 | Kang ......................... 358/1.15 |
| 2003/0184791 | A1 | * | 10/2003 | Mitani ....................... 358/1.15 |

FOREIGN PATENT DOCUMENTS

| JP | 04-364290 | 12/1992 |
| JP | 11-045556 | 2/1999 |
| JP | 11-134279 | 5/1999 |

* cited by examiner

Primary Examiner—Frantz Coby
(74) Attorney, Agent, or Firm—Foley & Lardner LLP

(57) ABSTRACT

When a recording medium is set in a slot of a CD-ROM drive, a DVD drive or a smart media drive, a system control section of a printing apparatus controls a display control section to cause a display panel to display selection items. When one of the selection items displayed on the display panel is selected by pushing, and a "PRINT" button is also pushed, the system control section acquires information on the selected item associated with the recording medium from a server apparatus and controls a print control section to execute a printing control.

8 Claims, 6 Drawing Sheets

```
SELECT DESIRED INFORMATION

☐ TUNE LIST                              50 yen
    ☐ WORD SHEET                            200 yen
    ▨ WORD SHEET (WITH ARTIST'S PHOTO)     1000 yen
    ☐ SCORE SHEET                           600 yen
    ▨ CALL RECEPTION MELODY DATA            100 yen ( RELATED DATA DISPLAY )    SUM [ 1100 ] yen ( PRINT )    ( FINISH )
```

INDEX INFORMATION

| MEDIA TYPE | DATA TYPE | DATA SIZE | SECTION NUMBER | SECTION INFORMATION |
|---|---|---|---|---|
| "CD" | "MUSIC" | "60 MIN." | "20" | |

16a

SECTION INFORMATION

| TITLE | CHARACTER DATA SIZE | CHARACTER TRACK NUMBER | SOUND DATA SIZE | SOUND TRACK NUMBER | IMAGE DATA SIZE | IMAGE TRACK NUMBER |
|---|---|---|---|---|---|---|
| | | | | | | |

PRINTING SYSTEM

BACKGROUND OF THE INVENTION

The present invention relates to a printing system for printing out information associated with data, which is recorded in a portable recording medium such as a compact disk (hereinafter referred to as CD) already kept by a user by purchase or rental or a CD-Recordable (CDR) produced or edited and kept by a user, or data which is recorded in a portable small-sized device such as a cellular phone, a mobile terminal or a digital camera.

There is known a system in which data is received via a network, with plural kinds of data being discriminated. Jpn. Pat. Appln. KOKAI Publication No. 11-45556 discloses an audio reproduction system, which reproduces related information by voice while recording compressed audio data in a recording medium.

There is also known a system in which data is received via a network, while a process for recording data in a recording medium and a process for outputting label information are executed in parallel. Jpn. Pat. Appln. KOKAI Publication No. 11-134279 discloses a media information distributing/recording system wherein information is distributed from a center device to a terminal device via a network and the information is recorded in a detachable recording medium. In this system, the terminal device that records information in the recording medium includes means for outputting label information or words in association with the recording medium in which designated media information is recorded.

However, as E-commerce develops and data transmission/reception via only networks prevails, the number of opportunities for providing and receiving image information or text information, which is inherent conventional paper media, would decrease. For example, in many cases, electrically acquired information is kept in a recording medium without a description, a manual or instructions of a product.

On the other hand, when various information is being accessed by a portable small-sized device such as a cellular phone, a mobile terminal or a digital camera, one can instantaneously record valuable information, which he/she has found at a moment, as well as pointer information relating to that valuable information. In this case, however, it is very efficient to view such detailed information on a large screen or a paper sheet, which permits a look of a large table. Since resources of a portable small-sized device are limited, there is a demand for a means for accessing detailed information derived from limited information.

BRIEF SUMMARY OF THE INVENTION

The object of the present invention is to provide a printing system for printing out, on a paper sheet, related information, which is unavailable by electronic recording, by analyzing data recorded in a portable recording medium such as a CD, a DVD or smart media, in which information is electronically recorded, or in a portable small-sized device such as a cellular phone, a mobile terminal or a digital camera.

In order to achieve the object, this invention may provide a printing system including a server storing various information, and a printing apparatus, connected to the server via a communication network, for printing information, the printing apparatus comprising: a read section configured to read information from an information recording medium in which the information is recorded; an analysis section for analyzing the information read by the read section; a transmission section configured to transmit an analysis result obtained by the analysis section and a request for information to be searched for on the basis of the analysis result to the server via the communication network; a reception section for receiving the information returned as a search result in the server; and a print section which prints out the information received by the reception section.

The present invention may provide a printing system including a server storing various information, and a printing apparatus, connected to the server via a communication network, for printing information, the printing apparatus comprising: a read section configured to read information from an information recording medium in which the information is recorded; an analysis section for analyzing the information read by the read section; a transmission section configured to transmit an analysis result obtained by the analysis section and a request for an information item to be searched for on the basis of the analysis result to the server via the communication network; a reception section configured to receive the information item returned as a search result in the server; a display section configured to display the information item received by the reception section; a selection instruction section configured to instruct printing by selecting the item displayed on the display section; a control section to execute a control for acquiring information on the selected item from the server via the communication network, when the selection instruction section has instructed the printing; and a print section which prints out the information acquired by the control of the control section.

The present invention may provide a printing system including a server storing various information, and a printing apparatus, connected to the server via a communication network, for printing information, the printing apparatus comprising: a communication control section configured to communicate with a portable terminal device in a radio or wired fashion and to execute a control for acquiring information stored in the portable terminal device; an analysis section configured to analyze the information acquired by the control of the communication control section; a transmission section configured to transmit an analysis result obtained by the analysis section and a request for information to be searched for on the basis of the analysis result to the server via the communication network; a reception section for receiving the information returned as a search result in the server; and a print section which prints out the information received by the reception section.

The present invention may provide a printing system including a server storing various information, and a printing apparatus, connected to the server via a communication network, for printing information, the printing apparatus comprising: a communication control section configured to communicate with a portable terminal device in a radio or wired fashion and to execute a control for acquiring information stored in the portable terminal device; an analysis section for analyzing the information acquired by the control of the communication control section; a transmission section configured to transmit an analysis result obtained by the analysis section and a request for an information item to be searched for on the basis of the analysis result to the server via the communication network; a reception section configured to receive the information item returned as a search result in the server; a display section configured to display the information item received by the reception section; a selection instruction section configured to instruct printing by selecting the item displayed on the display section; a control section to execute a control for acquiring information on the selected item from the server via the communication network, when the selection instruction section has instructed the printing; and a print section which prints out the information acquired by the control of the control section.

BRIEF DESCRIPTION OF THE SEVERAL VIEWS OF THE DRAWING

FIG. 3 shows an example of display of selection items on a display panel;

FIG. 5 is a view for describing the structures of an index information table and a selection information table;

DETAILED DESCRIPTION OF THE INVENTION

Embodiments of the present invention will now be described with reference to the accompanying drawings.

Figure 1:
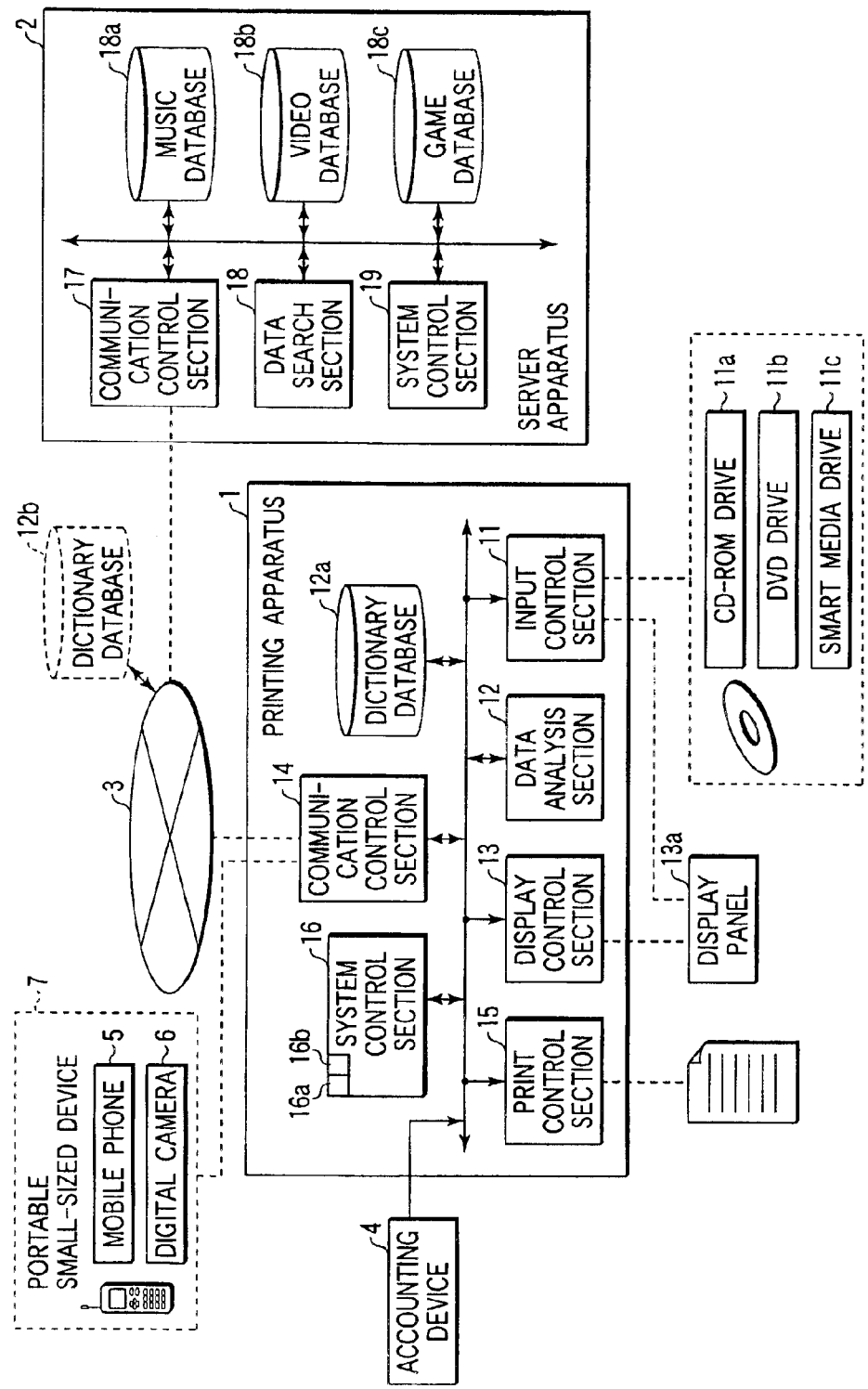
FIG. 1 is a block diagram schematically showing the structure of a printing system according to the present invention.

FIG. 1 schematically shows the structure of a printing system according to the present invention.

In the printing system, a printing apparatus 1 and a server apparatus 2 are connected via a network 3. The network 3 may be of any kind, for instance, the Internet via a LAN, the Internet via a public line, or the Internet via a radio link.

The printing apparatus 1 comprises an input control section 11; a data analysis section 12 for analyzing input data; dictionary data 12a to be used at the time of data analysis; a display control section 13 for controlling, for example, a display panel 13a integrally comprising a liquid crystal display and a touch panel, which provide a user interface, and performing display and inputting; a communication control section 14 for controlling information input/output with the network 3; a print control section 15 for printing out data on a paper sheet; and a system control section 16 for controlling the entirety of the printing apparatus 1.

The dictionary data 12a need not be provided within the printing apparatus 1, and it may be provided as dictionary data 12b on the network 3. In this case, the data analysis section 12 accesses the dictionary data 12b on the network 3 via the communication control section 14.

An accounting device 4 for carrying out an accounting process is connected to the printing apparatus 1.

A CD-ROM drive 11a, a DVD drive 11B and a smart media drive 11c, each having a slot for loading an associated recording medium, are connected to the input control section 11. Thus, a recording medium can be received at any time.

The data analysis section 12 analyzes information of the recording medium input through the input control section 11, or information input via a communication control section 14 from the portable small-sized device 7 such as a mobile phone 5 or a digital camera 6, thereby deriving a condition for a search in the server apparatus 1. This is the point of the present invention.

The display control section 13 causes the display panel 13a to display information to be presented to the user.

The communication control section 14 controls data transmission/reception with the network 3, and also controls radio or wired data input/output with the mobile phone 5 or digital camera 6.

The system control section 16 controls all the operations of the printing apparatus 1. The system control section 16 includes an index information table 16a and a section information table 16b, as will be described later in detail.

The server apparatus 2 comprises a communication control section 17 for controlling information input/output with the network 3; a data search section 18 for carrying out a data search process; a music database 18a; a movie database 18b; a game database 18c; and a system control section 19 for controlling all operations of the server apparatus 2.

The system control section 19 of the server apparatus 2 searches the data search section 18 (e.g. music database 18a if the data kind is music data) and acquires associated data according to the data search condition received via the communication control section 17. The system control section 19 transmits the acquired data to the network 3 via the communication control section 17.

Figure 2:
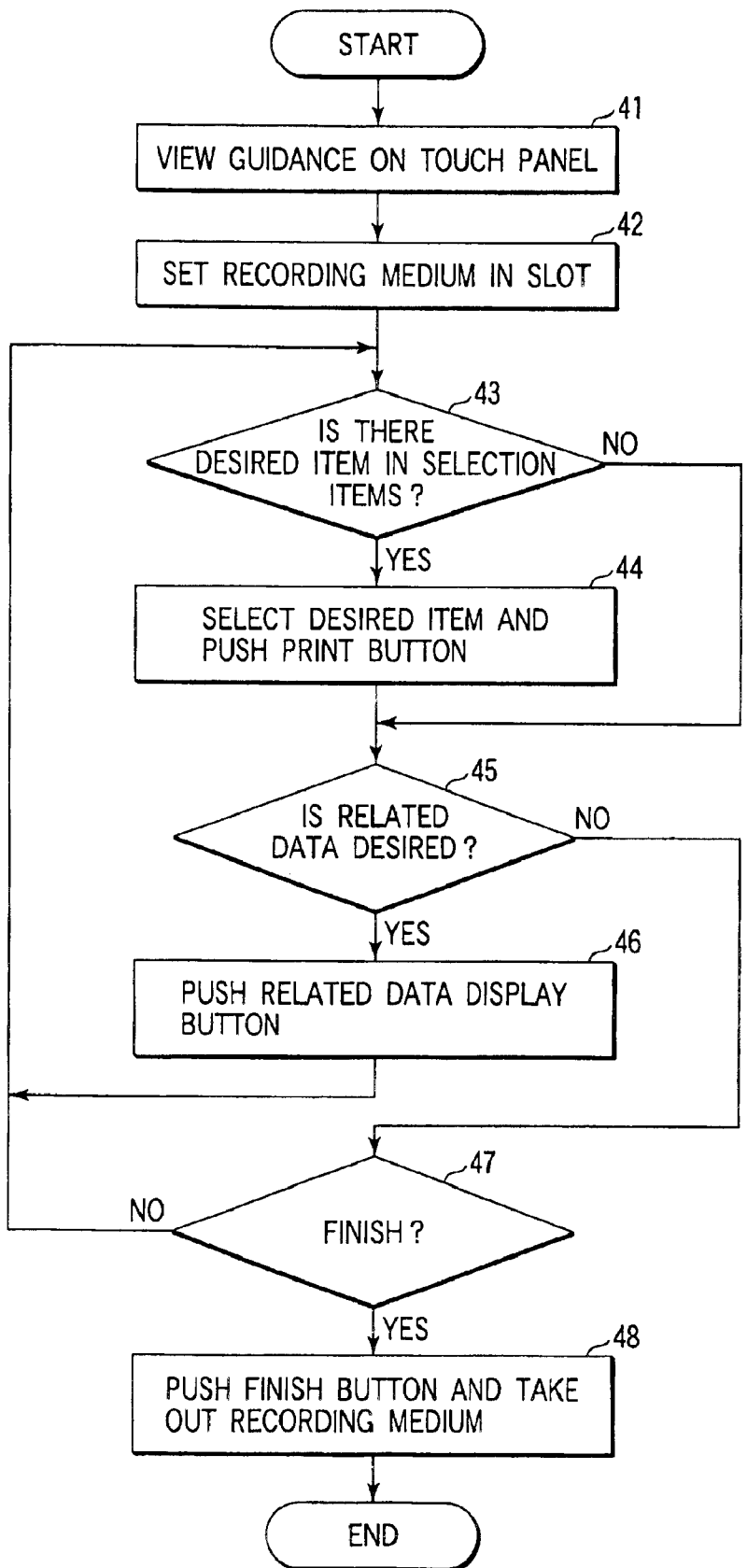
FIG. 2 is a flow chart for describing an operation of a first embodiment using this printing system.

An operation using the printing system with the above structure according to a first embodiment will now be described with reference to a flow chart of FIG. 2.

The user looks at the guidance on the display panel 13a (e.g. "Set medium in the slot") (41) and sets the recording medium, such as a CD-ROM, a DVD, or smart media, in the associated slot (42).

When the recording medium is set in the slot of the CD-ROM drive 11a, DVD drive 11b or smart media drive 11c, the system control section 16 of printing apparatus 1 controls the display control section 13 to cause the display panel 13a to display the selected item.

FIG. 3 shows an example of display of selection items on the display panel 13a. In FIG. 3, the display panel 13a displays selection items such as a tune list, a word sheet, a word sheet (with a photograph of an artist), a score sheet, and call reception melody data. It also displays prices for acquiring the information, a "RELATED DATA DISPLAY" button for instructing display of related data, a "PRINT" button for instructing printing, and a "FINISH" button for finish.

The user selects and pushes a desired item in the selection items displayed on the display panel 13a (43) and then pushes the "PRINT" button (44).

As will be described later in detail, when the "PRINT" button has been pushed, the system control section 16 acquires from the server apparatus 2 the information of the selected item associated with the recording medium and instructs the print control section 15 to effect printing.

If there is no desired information in the displayed selection items and the user desires related data, the user pushes the "RELATED DATA DISPLAY" button and returns to step 43 (45, 46).

If the related data is not necessary and the operation is to be finished (47), the user pushes the "FINISH" button and takes out the recording medium (48).

The user can obtain information printed out on a paper sheet through the series of the above operations.

Figure 4:
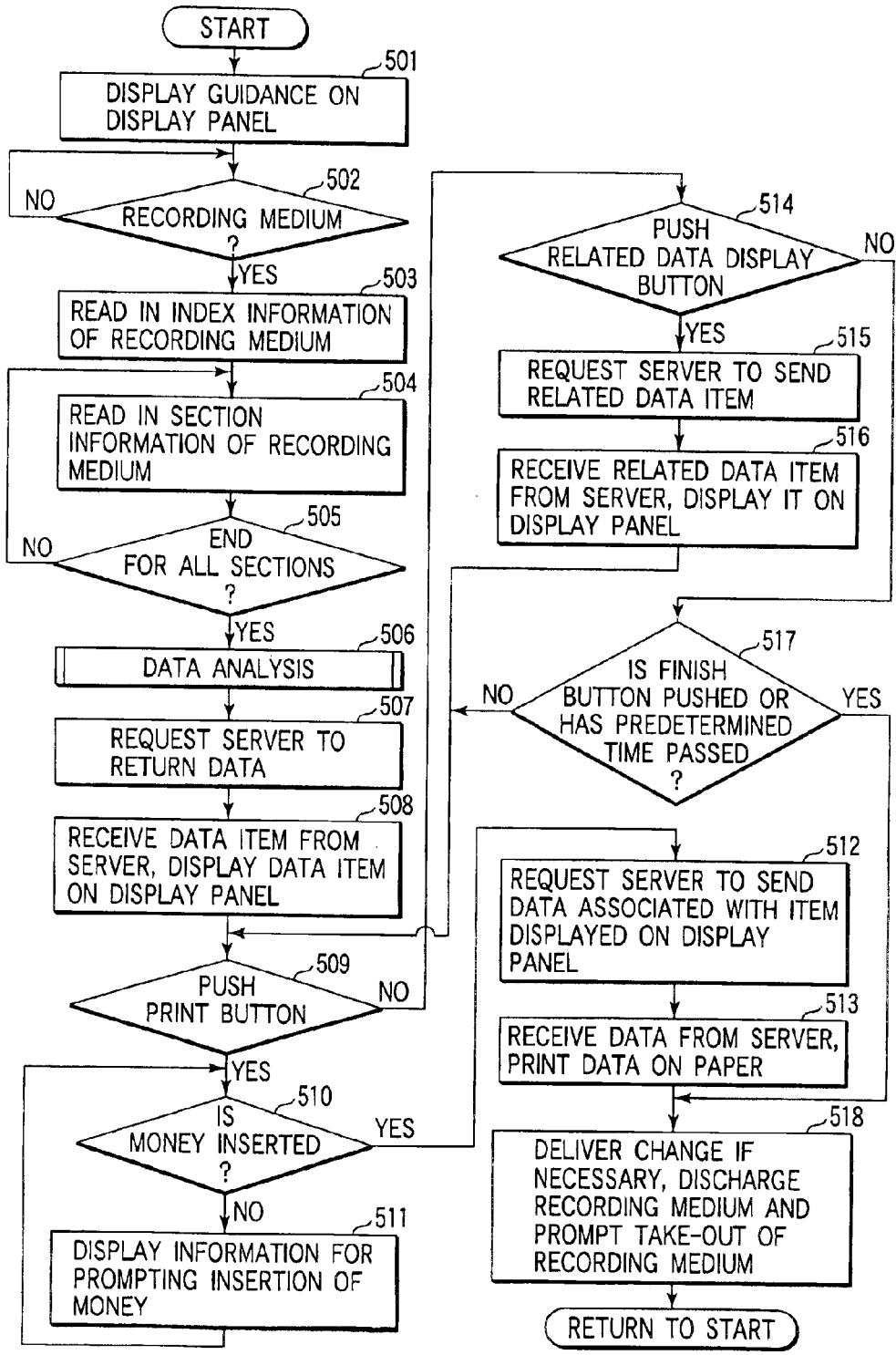
FIG. 4 is a flow chart for describing an operation of a printing apparatus according to the first embodiment.

An operation of the printing apparatus 1 according to the first embodiment will now be described with reference to a flow chart of FIG. 4.

In the standby state, the system control section 16 of printing apparatus 1 causes the display panel 13a to display guidance such as "SET RECORDING MEDIUM IN SLOT" (501).

When the system control section 16 has detected that the recording medium is set in the slot of the CD-ROM drive 11a, DVD drive 11b or smart media drive 11c (502), the system control section 16 reads in and acquires index information of the recording medium via the input control section 11 (503) and also reads in and acquires section information of all sections of the recording medium (504, 505).

The system control section 16 analyzes the read-in section information using the data analysis section 12 (506).

The system control section 16 transmits a search condition, which has been acquired by the analysis in the data analysis section 12, to the server apparatus 2 via the communication control section 14 and the network 3. The system control section 16 requests that the server apparatus 2 return the data associated with the search condition to the printing apparatus 1 (507).

Using the search condition received via the network 3 and communication control section 17, the system control section 19 of server apparatus 2 causes the data search section 18 to search the music database 18a, movie database 18b and game database 18c. The system control section 19 returns the data item obtained by the search to the printing apparatus 1 via the communication control section 17 and network 3.

When the communication control section 14 has received the data item returned from the server apparatus 2 to the printing apparatus 1 via the network 3, the system control section 16 sends the data item to the display control section 13 to cause the display panel 13a to display the data item (508).

If the data item on the display panel 13a is selected and the "PRINT" button is pushed (509), the system control section 16 checks whether money has been inserted from the accounting device 4 (510). If money has not been inserted, the system control section 16 controls the display control section 13 to cause the display panel 13a to display information for prompting the insertion of money (511) and stands by until the money is inserted.

If the money has been inserted, the system control section 16 transmits the information of the selected data item to the server apparatus 2 and requests return of associated data to the printing apparatus 1 (512).

Based on the data item received via the network 3 and communication control section 17, the system control section 19 of server apparatus 2 causes the data search section 18 to search the music database 18a, movie database 18b and game database 18c. The system control section 19 returns the retrieved data to the printing apparatus 1 via the communication control section 17 and network 3.

When the communication control section 14 has received the data returned to the printing apparatus 1 from the server apparatus 2 via the network 3, the system control section 16 supplies the received data to the print control section 15 to print out the data on a paper sheet (513). Thereafter, the system control section 16 delivers change from the accounting device 4, if necessary, and discharges the recording medium from the slot. The system control section 16 causes the display panel 13a to display guidance such as "TAKE OUT RECORDING MEDIUM", thus prompting the take-out of the recording medium (518). The control then returns to first step 501.

On the other hand, if the "PRINT" button is not pushed in step 509 and the "RELATED DATA DISPLAY" button is pushed (514), the system control section 16 requests the server apparatus 2 to return a related data item to the printing apparatus 1 (515).

In response to the request for transmission of the related data item, which was received via the communication control section 17 and network 3, the system control section 19 of server apparatus 2 causes the data search section 18 to search the music database 18a, movie database 18b and game database 18c. The system control section 19 returns the retrieved related data item to the printing apparatus 1 via the communication control section 17 and network 3.

When the communication control section 14 has received the related data item returned from the server apparatus 2 to the printing apparatus 1 via the network 3, the system control section 16 sends the related data item to the display control section 13 to cause the display panel 13a to display the related data item (516). The control thus returns to step 509.

If nether the "PRINT" button is pushed in step 509 nor the "RELATED DATA DISPLAY" button is pushed in step 514 and, instead, if the "FINISH" button has been pushed or a predetermined time period has passed (517), the system control section 16 delivers change, if necessary, and discharges the recording medium from the slot. The system control section 16 causes the display panel 13a to display guidance such as "TAKE OUT RECORDING MEDIUM", thus prompting the take-out of the recording medium (518). The control then returns to first step 501. If none of the buttons is pushed, the control returns to step 509.

A description will now be given of the data analysis operation of the data analysis section 12 in steps 502 to 506 in the case where a music medium is set in the slot.

When the system control section 16 has detected that a music medium is set in the slot of the CD-ROM drive 11a, DVD drive 11b or smart media drive 11c (502), the system control section 16 reads in and acquires index information and section information of all sections of the music medium via the input control section 11 (503, 504, 505).

The system control section 16 stores the index information and section information in the index information table 16a and section information table 16b, as shown in FIG. 5.

As regards the index information shown in FIG. 5, a media type "CD", a data type "MUSIC", a data size "60 MINUTES", and a section number "20" are determined.

As regards the section information shown in FIG. 5, the presence of data effective for information search, such as a title, a character track number, a sound data size, a sound track number, an image data size, and an image track number, is determined.

Based on these information items, the data analysis section 12 collects and analyzes all information effective for information search. The media type, data type, title information of each section, character information of each section, etc. are analyzed.

The method of analysis in the data analysis section 12 is not limited. In short, any method can be used, if it derives a search condition for retrieving information not recorded in the recording medium, on the basis of the information read out of the recording medium and the information in the dictionary data 12a.

For example, in the case of a music medium, a title and an artist are provided with a large weight, and character information is provided with a weight corresponding to the frequency of occurrence of words. Thus, a search condition is generated. As a result, information on a tune having a similar title or a hit tune in the same time period is obtained.

In the case of a movie medium, for instance, a related word, which cannot directly be acquired from a title, a movie director, a stage director, a star, a distributing agency or a prize title, is derived to produce a search condition. As a result, it is possible to obtain information on another movie or TV program having similar scenes, another movie or TV program featuring the same actor/actress, another movie put on in the same time period, etc.

For example, in the case of a game medium, a review appearing in business magazines is derived on the basis of a game title, an employed character, a writer or a copyright owner, and an analogical process is performed based on the dictionary data 12a to produce a search condition. As a result, information on other games popular in the same generation with similar evaluation is obtained.

The data item obtained from the result of the search request sent to the server apparatus 2 along with the search condition is delivered to the display control section 13 via the communication control section 14. The display control section 13 controls the display panel 13a to display the data item.

In the case of the music medium, for example, as shown in FIG. 3, prices are displayed for the selection items such as the tune list, word sheet, word sheet (with a photograph of an artist), score sheet, and call reception melody data. The box of the item, which has been selected by the direct touch of the user's finger, etc. on the touch panel screen of the display panel 13a, is displayed with emphasis and the total price is shown. The screen of the display panel 13a displays the "PRINT" button, "FINISH" button and "RELATED DATA DISPLAY" button. The input operations are effected when the user directly touches the displayed buttons on the touch panel with his/her finger.

As has been described above, when the user has a CD with no details of purchase (e.g. the name of the shop or the date of purchase), a CD with no title label or a CD-Recordable (CDR) storing electronic information that was obtained via a network and produced/edited by the user, the printing system of the present invention enables the user to obtain at any time the information which is normally printed on paper medium and added to the CD, etc.

The information printed on paper medium may be an image or a figure. It is thus possible to obtain various information, which can be viewed in a large amount at a time, requires no reproducing device, and cannot be obtained from electronic record alone.

Figure 6:
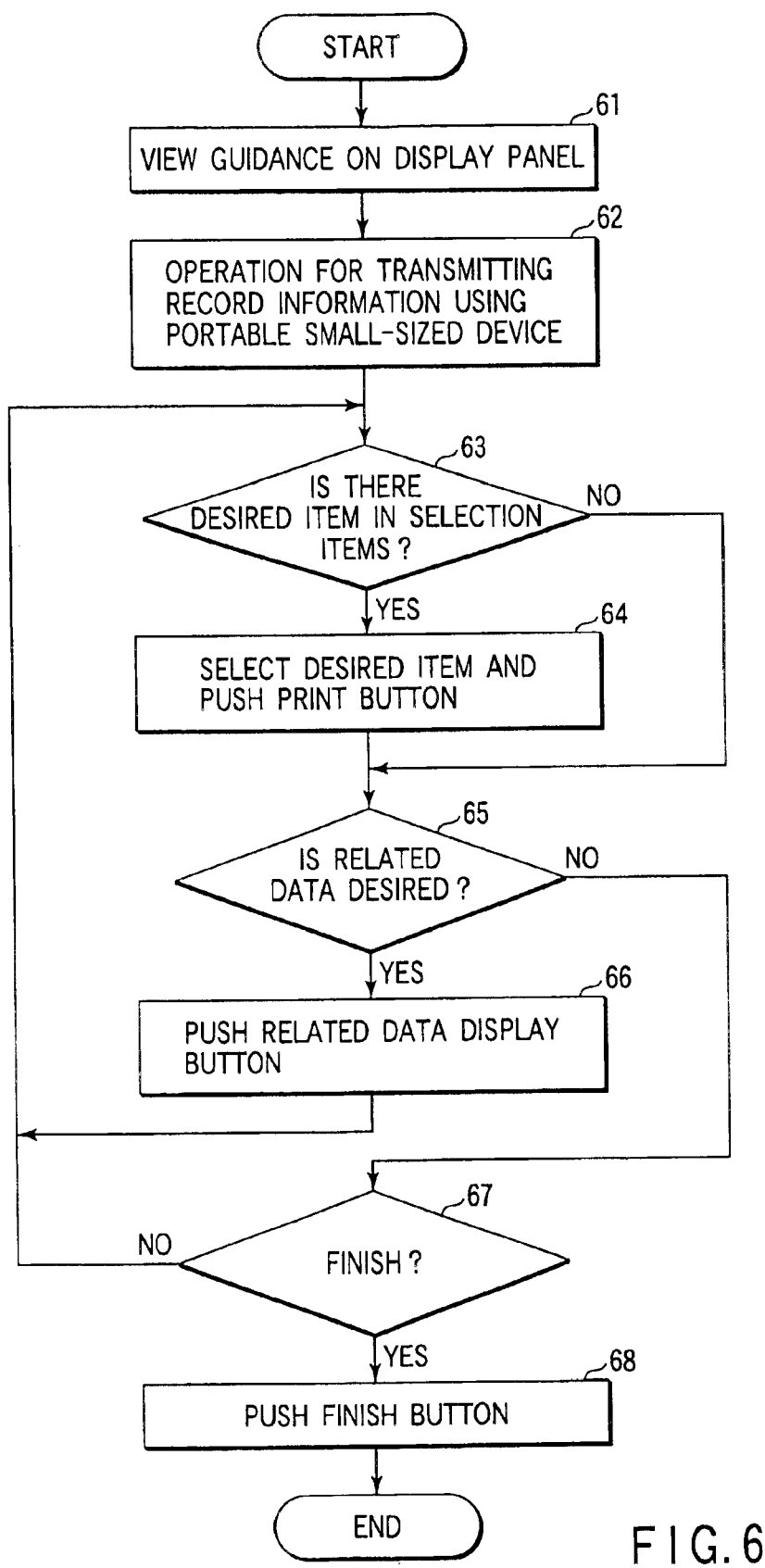
FIG. 6 is a flow chart for describing an operation of a second embodiment using this printing system.

An operation of the printing system according to a second embodiment of the invention will now be described with reference to a flow chart of FIG. 6.

To begin with, the user views guidance displayed on the display panel 13a (e.g. "SEND DATA FROM PORTABLE SMALL-SIZED DEVICE") (61), and performs an operation for sending record information from the portable small-sized device 7 such as mobile phone 5 or digital camera 6 to the printing apparatus 1 (62).

When the data from the portable small-sized device 7 is received via the communication control section 14, the system control section 16 of printing apparatus 1 controls the display control section 13 to cause the display panel 13a to display selection items. An example of the display on the display panel 13a is as shown in FIG. 3.

The user pushes a desired one of the selection items displayed on the display panel 13a (63) and then pushes the "PRINT" button (64).

When the "PRINT" button is pushed, the system control section 16 acquires information of the selected item associated with the portable media 7 from the server apparatus 2 and executes a printing control through the print control section 15, as will be described later in detail.

If there is no desired information in the displayed selection items and, instead, related information is desired, the user pushes the "RELATED DATA DISPLAY" button and returns to step 63 (65, 66).

If the related data is unnecessary and the operation is to be finished, the user pushes the "FINISH" button and finishes the operation (68).

The user can obtain information printed on a paper sheet through a series of these operations.

Figure 7:
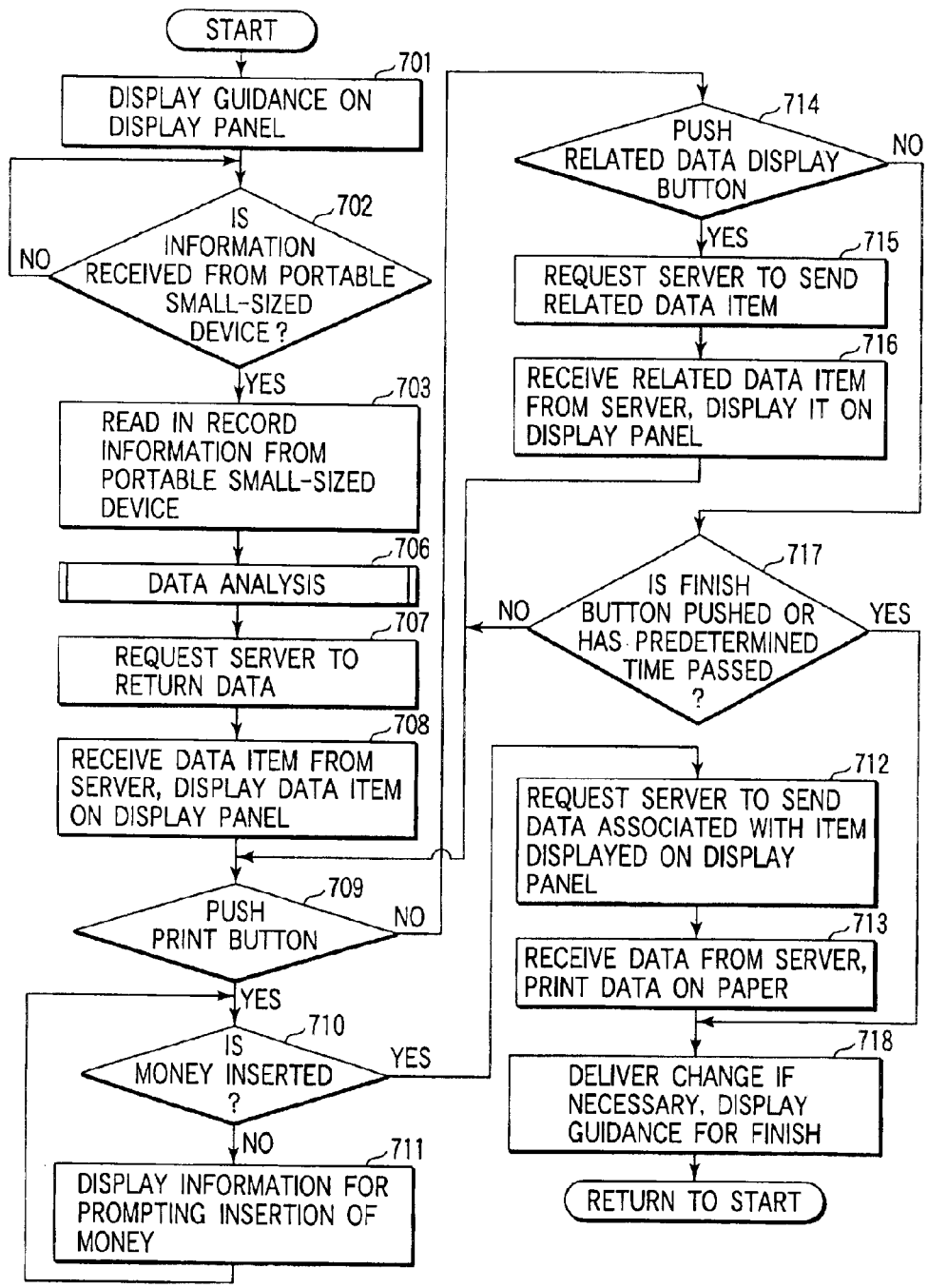
FIG. 7 is a flow chart for describing an operation of a printing apparatus according to the second embodiment.

An operation of the printing apparatus 1 in this printing system will now be described with reference to a flow chart of FIG. 7.

In the standby state, the system control section 16 of printing apparatus 1 causes the display panel 13a to display guidance such as "SEND DATA FROM PORTABLE SMALL-SIZED DEVICE " (701).

When the system control section 16 has detected that the record information is received from the portable small-sized device 7 (702), the system control section 16 reads in and acquires all information recorded in the portable small-sized device 7 (703).

The system control section 16 analyzes the read-in information using the data analysis section 12 (706).

The system control section 16 transmits a search condition, which has been acquired by the analysis in the data analysis section 12, to the server apparatus 2 via the communication control section 14 and the network 3. The system control section 16 requests that the server apparatus 2 return the data associated with the search condition to the printing apparatus 1 (707).

Using the search condition received via the network 3 and communication control section 17, the system control section 19 of server apparatus 2 causes the data search section 18 to search the music database 18a, movie database 18b and game database 18c. The system control section 19 returns the data item obtained by the search to the printing apparatus 1 via the communication control section 17 and network 3.

When the communication control section 14 has received the data returned from the server apparatus 2 to the printing apparatus 1 via the network 3, the system control section 16 sends the data to the display control section 13 to cause the display panel 13a to display the data (708).

If the data item on the display panel 13a is selected and the "PRINT" button is pushed (709), the system control section 16 checks whether money has been inserted from the accounting device 4 (710). If money has not been inserted, the system control section 16 controls the display control section 13 to cause the display panel 13a to display information for prompting the insertion of money (711) and stands by until the money is inserted.

If the money has been inserted, the system control section 16 transmits the information of the selected data item to the server apparatus 2 and requests return of associated data to the printing apparatus 1 (712).

Based on the data item received via the network 3 and communication control section 17, the system control section 19 of server apparatus 2 causes the data search section 18 to search the music database 18a, movie database 18b and game database 18c. The system control section 19 returns the retrieved data to the printing apparatus 1 via the communication control section 17 and network 3.

When the communication control section 14 has received the data returned to the printing apparatus 1 from the server apparatus 2 via the network 3, the system control section 16 supplies the received data to the print control section 15 to print out the data on a paper sheet (713). Thereafter, the system control section 16 delivers change from the accounting device 4, if necessary, and causes the display panel 13*a* to display guidance such as "TAKE OUT PRINT OUTPUT" (718). The control then returns to first step 701.

On the other hand, if the "PRINT" button is not pushed in step 709 and the "RELATED DATA DISPLAY" button is pushed (714), the system control section 16 requests the server apparatus 2 to return a related data item to the printing apparatus 1 (715).

In response to the request for transmission of the related data item, which was received via the communication control section 17 and network 3, the system control section 19 of server apparatus 2 causes the data search section 18 to search the music database 18*a*, movie database 18*b* and game database 18*c*. The system control section 19 returns the retrieved related data item to the printing apparatus 1 via the communication control section 17 and network 3.

When the communication control section 14 has received the related data item returned from the server apparatus 2 to the printing apparatus 1 via the network 3, the system control section 16 sends the related data item to the display control section 13 to cause the display panel 13*a* to display the related data item (716). The control thus returns to step 709.

If nether the "PRINT" button is pushed in step 709 nor the "RELATED DATA DISPLAY" button is pushed in step 714 and, instead, if the "FINISH" button has been pushed or a predetermined time period has passed (717), the system control section 16 delivers change, if necessary, and causes the display panel 13*a* to display guidance such as "TAKE OUT PRINT OUTPUT" (718). The control then returns to first step 701. If none of the buttons is pushed, the control returns to step 709.

As has been described above, with the use of the printing system of the present invention, it is possible to make use of a merit of the portable small-sized device that this device can obtain information at any time anywhere, while making up for a demerit thereof that resources (a memory capacity, in particular) are limited. In this way, information for a lead on the access to important information is read out and analyzed to derive related information, and this related information is printed out on a paper medium. Thereby, large-capacity data such as images and figures can be presented in a large amount at a time.

According to the present invention, when the user has a CD with no details of purchase (e.g. the name of the shop or the date of purchase), a CD with no title label or a CD-Recordable (CDR) storing electronic information that was obtained via a network, the user can obtain at any time the information which is normally printed on a paper medium and added to the CD, etc. The information printed on a paper medium may be an image or a figure. It is thus possible to obtain various information, which can be viewed in a large amount at a time, requires no reproducing device, and cannot be obtained from electronic record alone.

The portable small-sized device can obtain information at any time anywhere, but resources (a memory capacity, in particular) are limited. It is thus useful to record only information for a lead on the access to important information. This lead information is analyzed to derive the related information and print it out on a paper medium. Thereby, large-capacity data such as images and figures can be viewed in a large amount at a time.

What is claimed is:

1. A printing system including a server storing various information, and a printing apparatus, connected to the server via a communication network, for printing information, the printing apparatus comprising:

a read section configured to read information from an information recording medium in which the information is recorded;

an analysis section for performing analysis based on the information read by the read section and a predetermined dictionary database and deriving search conditions used for searching for information that is not recorded in the information recording medium;

a transmission section configured to transmit an analysis result obtained by the analysis section and a request for an information item to be searched for on the basis of the analysis result to the server via the communication network;

a reception section configured to receive the information item returned as a search result in the server;

a display section configured to display the information item received by the reception section;

a selection instruction section configured to instruct printing by selecting the item displayed on the display section;

a control section to execute a control for acquiring information on the selected item from the server via the communication network, when the selection instruction section has instructed the printing; and a print section which prints out the information acquired by the control of the control section.

2. A printing system according to claim 1, wherein the display section is a liquid crystal display section provided on the printing apparatus.

3. A printing system according to claim 1, wherein the selection instruction section is a display panel formed by integrating the display section of the printing apparatus with a touch panel.

4. A printing system according to claim 1, wherein the control section controls an accounting process associated with the selected item by using an accounting section.

5. A printing system according to claim 1, wherein the selection instruction section includes an instruction section configured to instruct information associated with the item displayed on the display section, and selectively instructing printing of the associated information instructed by the instruction section.

6. A printing system according to claim 1, wherein the dictionary database is provided in the printing apparatus.

7. A printing system according to claim 1, wherein the dictionary database is connected to the communication network and accessible from the analysis section.

8. A printing system according to claim 7, wherein the dictionary data is separate from the printing apparatus and is accessible from the analysis section only by way of the communication network.

\* \* \* \* \*